UNITED STATES PATENT OFFICE.

THEODORE T. WOODRUFF, OF PHILADELPHIA, PENNSYLVANIA, ASSIGNOR OF ONE-HALF HIS RIGHT TO EDWARD S. MORRIS, OF SAME PLACE.

IMPROVEMENT IN THE MANUFACTURE OF INDIGO.

Specification forming part of Letters Patent No. 126,665, dated May 14, 1872.

C.

Specification describing a certain Improved article of manufacture named "Condensed Indigo," invented by THEODORE T. WOODRUFF, of the city of Philadelphia, in the State of Pennsylvania.

All the indigo imported into this country is more or less imperfectly oxidized, and is also invariably mildewed or moldy, in consequence of the protracted mode of drying the magma or paste in the open air, which requires several months' exposure; and, besides, as the said magma or paste becomes sufficiently hardened it is required to be divided into small cubical blocks to expedite and perfect the drying, and to put it into suitably compact blocks for packing, transportation, and sale as an article of commerce; and these blocks being very porous and fragile, and, consequently, subject to such disintegration in packing and transportation as renders much of the article unsalable waste. In the manufacture of indigo from the plant it is, therefore, of the greatest importance that the magma or paste be uniformly oxidized and rapidly dried, in order to produce the best indigo, and the same entirely free from mold or fungus.

The processes and apparatuses described in my specifications A and B effectually provide for the aforesaid requirements; but, as the rapidity of my drying process necessarily causes the drying magma to crack and crumble into small irregular fragments, it becomes necessary, as an article of commerce, that it be consolidated into blocks of any required size or form that will not be liable to the breakage and waste before referred to.

My present invention consists of solid blocks of dry indigo, powerfully condensed into any suitable sizes or forms required for packing and transportation. I produce the said blocks by hydraulic or other strong pressure, applied to the dried broken fragments or powder of the indigo in suitable molds.

I claim as my invention—

The condensed indigo described, as an improved commercial article of manufacture.

THEODORE T. WOODRUFF.

Witnesses:
BENJ. MORISON,
WM. H. MORISON.